United States Patent [19]

Cartwright

[11] 4,041,199

[45] Aug. 9, 1977

[54] REFRACTORY HEAT-INSULATING MATERIALS

[75] Inventor: John Edward Cartwright, Birmingham, England

[73] Assignee: Foseco International Limited, Birmingham, England

[21] Appl. No.: 637,522

[22] Filed: Dec. 4, 1975

Related U.S. Application Data

[63] Continuation-in-part of Ser. No. 429,799, Jan. 2, 1974, abandoned, which is a continuation of Ser. No. 189,462, Oct. 14, 1971, abandoned, which is a continuation-in-part of Ser. No. 860,398, Sept. 23, 1969, abandoned.

[51] Int. Cl.$^2$ .................. F16L 59/02; C04B 35/52; C04B 35/14; C04B 35/02
[52] U.S. Cl. .................................. 428/36; 106/56; 106/62; 106/65; 106/69; 106/84; 106/210; 428/283; 428/291; 428/323; 428/328; 428/331; 428/388; 428/389; 428/446; 428/450; 428/532; 428/542

[58] Field of Search .................. 106/56, 69, 65, 84, 106/210, 62; 252/42; 428/331, 323, 446, 450, 902, 36, 532, 208, 210, 283, 291, 328, 403, 404, 388, 389, 542; 249/197; 164/41

[56] References Cited

U.S. PATENT DOCUMENTS

| 2,811,457 | 10/1957 | Speil | 106/69 |
| 3,231,401 | 1/1966 | Price | 106/69 |
| 3,567,667 | 3/1971 | Rumbold | 260/17.2 |
| 3,870,595 | 3/1975 | Hawthorne | 415/214 |

FOREIGN PATENT DOCUMENTS

| 894,056 | 4/1962 | United Kingdom | 106/65 |
| 1,159,492 | 7/1969 | United Kingdom | |
| 1,016,105 | 1/1966 | United Kingdom | |
| 1,117,977 | 6/1968 | United Kingdom | |
| 1,000,038 | 8/1965 | United Kingdom | |

*Primary Examiner*—Ellis Robinson
*Attorney, Agent, or Firm*—Leydig, Voit, Osann, Mayer & Holt, Ltd.

[57] ABSTRACT

Refractory heat insulating materials consist of 45–75% by weight refractory aluminosilicate fiber, 2–16% by weight a binding agent consisting of starch and colloidal silica, and 1–20% by weight particulate aluminum, magnesium and/or silicon.

6 Claims, No Drawings

REFRACTORY HEAT-INSULATING MATERIALS

CROSS REFERENCES TO RELATED APPLICATIONS

The present application is a continuation-in-part of co-pending application Ser. No. 429,799 filed Jan. 2, 1974, now abandoned which is a continuation of Ser. No. 189,462 filed Oct. 14, 1971 (now abandoned) which is a continuation-in-part of Ser. No. 860,398 filed Sept. 23, 1969 (now abandoned).

FIELD OF THE INVENTION

The present invention relates to refractory heat insulating materials for use in molten metal casting. Though their use is not so limited, the materials according to the present invention are of principal value in the casting of steel, because of their properties at very high temperatures.

DESCRIPTION OF PRIOR ART

In past years, much effort has been directed in the metallurgical industry towards the provision of refractory heat insulating materials for use in the casting of molten metals to delay head metal solidification. There are numerous patent specifications published concerning such materials of greater or lesser value. Many compositions suitable for the purpose consist of fibrous material, particulate refractory material and binder. If the fibrous material used is organic, then the composition must contain a high proportion of refractory particulate material in order to be sufficiently refractory; this, however, lowers the heat insulation ability of the composition. The alternative solution, that of using refractory fibres, thus allowing the use of less particulate refractory and increasing the heat insulation ability, is attractive, save for the difficulty of securing a suitably refractory fibre especially if the final materials are to be exposed to steelpouring temperatures. Asbestos is a suitable fibre for many uses, but the asbestosis hazard makes it less desirable and in some coountries unusable. The synthetic inorganic refractory fibres such as rock wool, slag wool and mineral wool tend, however, to soften at steelpouring temperatures, which prevents the use of compositions containing a high proportion thereof with steel. They may, however, be used in low proportion such as described in U.S. Pat. No. 3,567,667 to Rumbold.

Previous attempts, such as that made in U.S. Pat. No. 3,567,667 to Rumbold, have shown that high fibre contents (and thus high insulating values) are not obtainable save at the cost of a loss in refractoriness. I have now found that if aluminium silicate fibre is used, filled with a particulate metal, then sleeves and slabs formed from such a composition are very refractory and can withstand steelmaking temperatures.

GENERAL DESCRIPTION OF THE INVENTION

According to my invention, I provide a refractory heat insulating material which comprises 45-75% by weight aluminosilicate fiber, 1-20% by weight aluminium, magnesium or silicon in particulate form and 2-16% by weight a binding agent consisting of starch and colloidal silica. If desired, the material may contain up to 25% of inert particulate refractory material, e.g. crushed coke, alumina, silica, magnesia, zircon or other refractory silicate. The preferred content of aluminosilicate fiber is 48-60% by weight.

It is found that riser sleeves hot top lining slabs, feeder heads and like shapes made of such refractory heat insulating materials can be used satisfactorily in the casting of steel, at high temperatures such as 1600°-1650° C. They are highly heat insulative and very permeable, thus minimizing the incidence of gas porosity in the castings. In use, they give off little or no fume, and they are easily handled before use. In terms of physical characteristics, the refractory heat insulating materials of this invention are preferably resilient fibrous slabs or sleeves of material of density 0.25 to 0.40 gm/cc.

It should be observed that the refractory heat insulating materials of this invention are free from exothermically reacting components, i.e., are free from oxidizing agents for the particulate metal therein.

It is believed that a principal cause of unsatisfactory performance of many of the known types of riser sleeve is the presence of molten oxides, e.g. of iron and manganese on the surface of the steel, which tend to flux away and destroy many of the ingredients of previous refractory heat insulating compositions, and thus render them ineffective. It is believed that in the present case, the elemental metal in the heat insulating material reduces the molten iron oxide to iron, with the production of a highly refractory oxide ($Al_2O_3$, MgO or $SiO_2$) which forms a protective layer over the steel-contacting surface of the heat insulating material. It is found that by the use of the present invention, refractory heat-insulating materials may be produced which are usable with steel while having a comparatively low density (and low thermal conductivity). Prior materials, for example those described in U.S. Pat. No. 3,567,667, have tended to be insufficiently refractory for use with steel, unless containing much expensive fiber and a high proportion of refractory filler. By means of the present invention, materials usable with steel but having a density of below 0.5 gm/cc may be produced.

The binding agent used to bond the ingredients to coherent form consists of a combination of starch and colloidal silica. It has been found that the use of this particular combination of materials as the binder provides unexpectedly high transverse strengths and good product integrity and handleability, as compared with the use of other binders, including either colloidal silica or starch used alone.

The particulate metal used is preferably of a grading such that at least 99% by weight will pass a 0.053 mm opening mesh.

The method of formation of the heat-insulating material is preferably that of forming a slurry of the ingredients in a liquid medium (usually water) and sucking the liquid through a mesh former so as to deposit on the former a body of the slurry solids, and subsequently removing and drying the coherent shape so formed.

A particular process for producing such materials is described in British patent specification No. 1,204,472. The slurry solids content employed is preferably in the range of 0.1 to 10% by weight. In order to secure satisfactory dispersion of the ingredients in the slurry, suitable suspension/binder systems should be used, e.g. aluminum sulphate/colloidal silica sol.

SPECIFIC EXAMPLES OF THE INVENTION

The following examples will serve to illustrate the invention:

EXAMPLE 1

A 1% solids content aqueous slurry was made up by adding the following ingredients in the proportions by weight stated:

| | |
|---|---|
| Aluminosilicate fibre | 53.0% |
| Aluminum (99% 0.053 mm) | 7.0% |
| Colloidal silica sol (30% by weight SiO$_2$) | 15.0% |
| Starch | 7.0% |
| Alumina | 17.0% |
| Aluminum sulphate | 1.0% |

The aluminosilicate fibre had an analysis, by weight of 42–57% Al$_2$O$_3$, 45–57% SiO$_2$ and 1–6% TiO$_2$, together with traces of other oxides.

This slurry was dewatered into a cylindrical mesh former to deposit a sleeve of thickness 12 mm, which was stripped from the former and dried at 160° C for 2½ hours. Such a sleeve was used as a riser sleeve in a large steel casting, other risers of which were lined with commercial riser sleeves of the same dimensions. After casting, the risers were examined. The commercial sleeves were badly damaged and the risers showed a quantity of pipe, indicating insufficient thermal insulation. The riser sleeve according to the invention was substantially undamaged, and solidified riser had a fairly flat top and showed no pipe into the casting.

EXAMPLE 2

A 1% solids content aqueous slurry was prepared by adding the following ingredients in the proportions by weight stated:

| | |
|---|---|
| Aluminosilicate fibre | 72% |
| Starch | 6% |
| Colloidal silica (as 30% SiO$_2$ sol) | 5.5% |
| Aluminum powder (99.7% <0.053mm) | 9% |
| Alumina | 6.5% |
| Aluminum sulphate | 1% |

Using the process described in British patent specification No. 1,204,472, 75mm × 150mm high sleeves were produced. The density was 0.30–0.40 g/cc.

One such sleeve was used to feed a 120mm cube (a standard laid down by the Steel Foundries Society of America) the assembly being molded up in silicate bonded sand. A bottom running system was used and the casting was produced from fully killed, 0.24–0.40 carbon steel, at a ladle temperature of 1590±10° C. The surface of the metal in the sleeve was covered with a layer of FERRUX 40 antipiping compound.

After casting, the sleeve stripped easily from the riser giving a smooth surface free from penetration or dilation. On sectioning the casting was found to be sound.

EXAMPLE 3

Comparative tests were carried out using two sleeves, one of which contained aluminum.

Low solids content slurries were prepared by dispersing the following materials in 400 litres of water:

| | | |
|---|---|---|
| (A) | Aluminosilicate fibre | 1500 g |
| | Starch | 140 g |
| | Colloidal silica sol (30% by weight SiO$_2$) | 400 g |
| | Aluminum sulphate | 25 g |
| (B) | Aluminosilicate fibre | 1500 g |
| | Starch | 140 g |
| | Colloidal silica (30% by weight SiO$_2$) | 400 g |
| | Aluminum sulphate | 25 g |
| | Aluminum powder (99.7% <0.053mm) | 300 g |

Using the process described in British patent specification No. 1,240,472, 75 mm internal diameter by 150 mm high sleeves of wall thickness 12 mm were formed using a forming time of 60 seconds. These sleeves were then used to riser 120 mm cube steel castings and the following results were obtained.

The sleeve which did not contain aluminum produced a poor riser surface due to slagging and metal penetration, appreciable dilation, and also unsoundness in the casting. However, the sleeve containing aluminum gave considerable improvement with regard to slagging, penetration, and dilation, and its feeding characteristics were good.

Dilation was assessed by measuring the diameter of the riser at its base; the dimensions were 75mm in the case of the sleeve containing aluminium and 96mm in the case of the sleeve without aluminium.

Feeding characteristics were assessed by measuring the pipe depth in cms. from the interface between the riser and the casting, the results being recorded as positive into the riser and negative into the casting. The sleeve containing aluminum produced a pipe depth of + 3.6 cm., while the sleeve without aluminum produced a pipe depth of −5.5 cm.

I claim as my invention:

1. A refractory heat-insulating material consisting essentially of 45–75% by weight of aluminosilicate fibre; 1–20% by weight of an element selected from the class consisting of aluminium, magnesium and silicon in particulate form; 0–25% by weight of a particulate refractory filler; and 2–16% by weight of a binding agent consisting of starch and a colloidal silica binder prepared by drying a colloidal silica sol.

2. The refractory heat-insulating material of claim 1 wherein said refractory filler is a member selected from the group consisting of crushed coke, alumina, magnesia and silica.

3. The refractory heat-insulating material of claim 1 wherein at least 99% by weight of the element in particulate form will pass a 0.053 mm opening mesh.

4. The refractory heat-insulating material of claim 1 wherein said element in particulate form is aluminium.

5. The refractory heat-insulating material of claim 1 wherein the aluminosilicate fibre is present in an amount of 48–60% by weight.

6. A slab or sleeve suitable for use as a lining for a riser, feeder head, hot top or mould in the casting of steel comprising a refractory heat-insulating material consisting of 45–75% of its weight of aluminosilicate fibre, the remainder of the material consisting essentially of an element selected from the groups consisting of aluminium, magnesium and silicon in particulate form and present in an amount of 1–20% by weight and 2–16% by weight of a binding agent consisting of starch and a colloidal silica prepared by drying a colloidal silica sol binder.

* * * * *